Patented Jan. 17, 1939

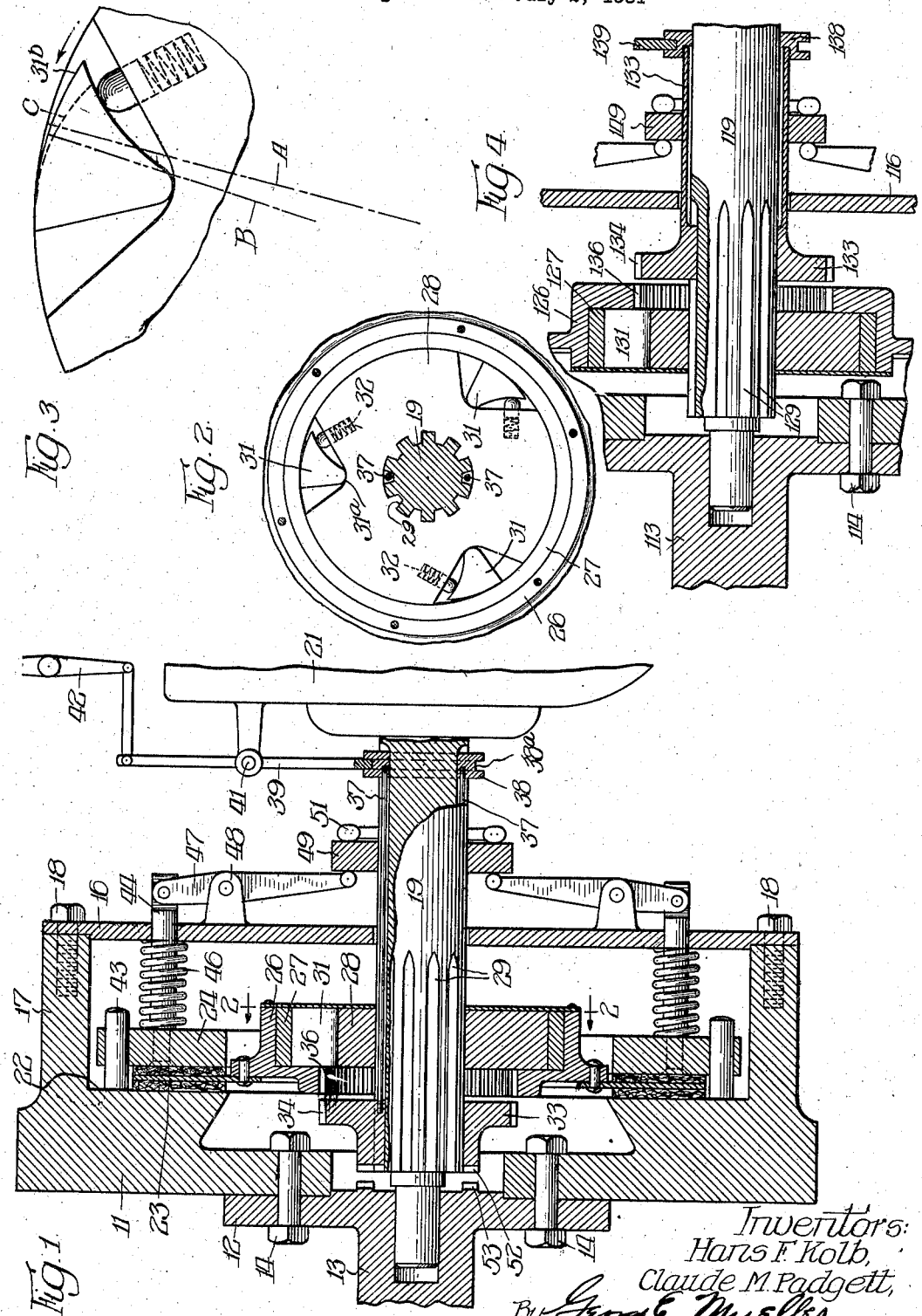

2,144,160

UNITED STATES PATENT OFFICE 2,144,160

AUTOMOBILE CLUTCH MECHANISM

Hans F. Kolb and Claude M. Padgett, Chicago, Ill., assignors, by mesne assignments, to Chrysler Corporation, Detroit, Mich., a corporation of Delaware Application July 2, 1931, Serial No. 548,327
Renewed January 2, 1937

18 Claims. (Cl. 192—48)

Our invention relates to automobile clutch mechanisms. It relates more in particular to a clutch mechanism of the so-called "free-wheeling" or "over-running clutch" type. The clutch of our invention is also designed to provide a direct driving connection for the automobile without the over-running clutch function.

One of the principal objects of our present invention is the provision of means whereby an automobile may be driven directly instead of through the usual friction plate clutch.

Another object is the provision of an automobile which may be driven directly without the friction plate clutch, directly but through a friction plate clutch or through a uni-directional or over-running clutch for permitting the wheel and other driven parts to over-run the drive shaft of the engine.

Another object of our invention is the provision of an improved type of over-running clutch.

Another object is the provision of an over-running clutch which may be rendered ineffective, and the automobile propelled by a direct conventional drive connection.

Another object is the provision of an over-running clutch mechanism which may be rendered ineffective at any time at the will of the driver whether the automobile is running or stationary.

Another object is the provision of an over-running clutch mechanism which will operate in all speeds without shifting, including reverse.

Another object is the provision of an over-running clutch mechanism adapted to be housed in the ordinary clutch and which is capable of being rendered ineffective so as to provide a direct drive through the conventional clutch mechanism.

Other objects and features of the invention will be apparent from a consideration of the following detail description, taken with the accompanying drawing wherein, Fig. 1 is a vertical central sectional view showing one embodiment which our invention may take, Fig. 2 is a sectional view thereof taken along the line 2—2 of Fig. 1, Fig. 3 is an enlarged and exaggerated view showing a detail of the rocking pawls, and Fig. 4 is a modified view of the design of Figs. 1 and 2.

As herein shown, our invention is applied to a standard type of single plate clutch. It is understood, however, that it may be employed in other ways and with other conventional types of clutch mechanisms.

In the form shown we provide a fly wheel 11, bolted to a flange 12 of a shaft 13, which shaft is either the motor crank shaft or an extension thereof. Bolts 14 may be employed for mounting the fly wheel in place on the flange. A cover plate 16 is secured to an outer flange extension 17 of the fly wheel by bolts 18. This forms a housing in which the conventional clutch and the mechanism of our invention is adapted to be contained.

The drive is from the shaft 13 to the shaft 19 by means which will be described. This shaft 19 is the driven shaft of the clutch but comprises the main transmission driving shaft for conveying motion of the engine to the transmission 21.

On the inside of the fly wheel a main clutch plate 22 is provided and a shiftable clutch plate 23 is held against the plate 22 by a pressure ring 24 operated by mechanism to be described. This shiftable clutch plate 23 is secured to an over-running clutch housing 26. This over-running clutch housing has an inner race-way 27 which forms part of an over-running clutch mechanism for transmitting motion of the shiftable plate 23 to the shaft 19.

An over-running clutch hub 28 is provided with internal splines, which engage in splines 29 on the shaft 19. Motion of the over-running clutch hub 28 is therefore directly communicated to the shaft 19. For transmitting motion of the over-running clutch housing to the hub 28 we provide a plurality of rocking pawls or blocks 31 which are adapted to engage between the housing and hub by a wedging action when the speed of the clutch housing tends to be in excess of the speed of the hub 28. These blocks are of general triangular shape and are longer along one side than along the other side. Their apices 31a engage in cut-away portions of the hub in back of the radial line, and a rocking motion takes place about the apices. Springs 32 tend to force the blocks in a direction to wedge them between the race-way and hub so that there is always a light engagement between the blocks 31 and the race-way 27.

The drawing is made in accordance with conventional motor design in which the over-running clutch housing would travel in the direction indicated by the arrow in Fig. 3. When the speed of the over-running clutch housing tends to be in excess of that of the hub 28, the blocks 31 are rocked in a direction to present their longer sides to the race-way, thereby causing a wedging action which so connects the hub and housing as to cause a drive to the hub through the blocks. As soon, however, as the speed of the hub 28 tends to be in excess of that of the over-running clutch housing, the blocks will tend to be released and will slide with respect to the race-way, thereby permitting the over-running clutch action desired.

In Fig. 3 we show a feature of our driving pawls, as an enlargement of a portion of Fig. 2. Fig. 3, however, is somewhat exaggerated in order more clearly to illustrate the principles and structure involved.

The rocking pawl or block 31 as previously described is of a general triangular shape and has its apex fulcrumed or pivoted so that it can move with a rolling action on the cut-away portion of the hub. Since the forward side of the block has a longer radius than the rear side, the rocking movement, due to the driving action of the over-running clutch housing causes the wedging action which connects the clutch for uni-directional drive. The apex of the block or pawl may be along the radius A which passes through the center of the driving shaft. However, we obtain better results if we pivot it behind the center line such as along the line B as shown in Fig. 3. The dotted line C on the pawl represents an equal distance all along the base of the pawl measured from the apex 31a. The metal between the line C and the base 31b can be substantially all worn away by friction and still the pawl will operate satisfactorily. As explained, the view of Fig. 3 is an exaggeration but it will be seen that by this arrangement we may produce an over-running or uni-directional friction clutch which can be expected to last for the normal life of an automobile.

It is understood that these blocks represent merely one way of constructing the over-running clutch, and that other over-running arrangements can be employed with the other features of the invention. We prefer the construction shown, however, for the reason that the wear is more even, there is very little possibility of pitting or flattening, such as sometimes occurs with rollers, and the pawls although somewhat more expensive to manufacture than ordinary rollers are considerably less expensive than other forms designed to overcome the difficulties encountered in the skew roller type of over-running clutch. Moreover, the present form of clutch releases immediately and engages substantially immediately. It also automatically compensates for wear and the fact that the apex is placed in back of the radial line prevents any possibility of a toggle effect which would take place if the pawl were permitted to rock past the radial line. Many forms of over-running clutches are objectionable in this respect. Another salient feature of the present form of clutch is that there is a relatively large area of contact in the two clutch members, which, as compared with the skew roller type, gives the effect of an extremely large roller. There is some advantage in using three rolling pawls of this character, as it provides an automatic alignment under all circumstances, but substantially the same results can be obtained with any number, there being a practical limitation of course in the space available around the hub.

The mechanism heretofore described transmits the movement of the shiftable plate 23 to the shaft 19 by an over-running clutch mechanism which doesn't provide for conventional direct drive. We do provide for such an arrangement, however, which may be used at any time without affecting conventional shifting of the gears, or in any other way interfering with the conventional drive of the automobile.

A direct drive hub or shiftable tooth-carrier 33 is splined to the shaft 19 between the over-running clutch housing 26 and the fly wheel 11. This hub is provided with external splines or clutch teeth 34 which are adapted to mesh with internal splines or clutch teeth 36 on the over-running clutch housing 26 to connect the housing 26 directly to the shaft 19 so as to eliminate or render ineffective the over-running clutch feature heretofore described.

We provide a very simple and convenient arrangement for shifting this direct drive hub 33. This consists of a pair of rods 37 which are secured to the hub 33 and which extend to a shift ring 38 carried on the shaft 19. These rods 37 lie in slots which are continuations of splines in the shaft and they pass through the hub 28 as shown in Fig. 2 by cutting away two teeth on the hub 28, teeth that normally would mesh with splines 29 which are in alignment with the slots which hold the rods 37. We may construct these rods where they pass between the shaft 19 and the hub 28 so as to act as key-ways, but sufficient driving connection will be present between the shaft 19 and the hub 28 under most circumstances to render this provision unnecessary.

For shifting the direct drive hub 33, we provide a shift lever 39 having bifurcations extending into a slot 38a on the ring 38. The lever 39 is pivoted at 41 and any suitable connections 42 are provided, which connections may extend to the driver's seat to permit the driver to shift the direct drive hub 33 without moving from his driving position.

Any conventional means for operating the pressure ring 24 may be employed. In the present embodiment we show a clutch ring shiftable on studs 43, shift rods 44 are secured on the ring 24 and extend through the cover plate 16. Springs 46 surrounding the shift rods 44 engage the pressure plate and cover plate 16 so as normally to hold the pressure ring against the shiftable plate 23, which in turn is held against the main plate 22. Shifting levers 47 pivoted intermediate their ends to brackets 48 have one end connected to the shift rods 44. The other ends of the levers 44 are disposed in the path of a thrust ring 49, which in turn is moved along the shaft 19 by a shifting fork or collar 51 operated from the usual clutch pedal (not shown).

It will be recalled that we also provide means for a direct drive without going through the usual friction clutch. This we accomplish by the member 33 previously referred to as the direct drive hub. It was explained that this member could be shifted to engage the outer teeth 34 in the over-running clutch hub to provide a direct drive or what is sometimes spoken of as a free-wheel cut-away. The member 33, however, also is provided with teeth 52 which are adapted to engage the teeth 53 disposed at the end of the shaft 13. This is illustrative, however, as the direct engagement may be made with any part of the shaft or fly wheel so that the drive is direct through the member 33 to the shaft 19 without going through the clutch. This shift is accomplished by the shift lever 42, movement in one direction serving to connect the teeth 34 and 36 and movement in the opposite direction tending to engage the teeth 52 and 53, which thereby function as a jaw clutch. The over-running clutch is of value in making the shift to the direct drive for the reason that it permits relative movement which is necessary for the alignment of the teeth 52 and 53.

In the modified form of Fig. 4, substantially the same construction is employed as shown in Fig. 1, with the exception that the over-running clutch and direct drive member are reversed. The same reference characters are employed on corresponding parts but prefixed in the modified construction by the character 1. In this construction, however, the member 133 takes the form of a sleeve and the sleeve is carried out directly to the collar 138. The shifting is accomplished by movement of the sleeve by the member 139. The thrust ring 149 then rides on the sleeve. In this form no direct drive between the shaft 113 and shaft 119 is provided.

What we claim as new and desire to protect by Letters Patent of the United States is:

1. In an automobile, in combination, a main clutch plate, a shiftable clutch plate, a driven shaft, an over-running clutch housing secured to said shiftable plate, an over-running clutch hub splined on said driven shaft, over-running clutch connections between said housing and hub, a direct drive hub splined on said driven shaft and disposed between said main plate and over-running clutch housing, shift rods secured to said direct drive hub and extending through said over-running clutch hub, and means connected to said shift rods for moving the direct drive hub into direct engagement with the over-running clutch housing, whereby a direct drive is effected between said shiftable clutch plate and said driven shaft.

2. In an automobile, in combination, a clutch including a main friction clutch including a driving plate and driven plate, a driving shaft connected to the driving clutch plate, a driven shaft adapted to be driven by said driven clutch plate, an over-running clutch disposed between said driven plate and driven shaft, a direct drive hub splined on the driven shaft having teeth adapted to mesh with teeth carried by the driven plate assembly, whereby the over-running clutch can be rendered ineffective, cooperating jaw clutch members on the direct drive hub and driving shaft, and means for moving the direct drive hub to provide a direct drive between the two shafts, a direct drive through the plate clutch or drive through the over-running clutch.

3. In an automobile, a driving shaft, a friction clutch plate secured to the driving shaft, a driven shaft, a shiftable clutch plate, an over-running clutch connection between the driven shaft and shiftable clutch plate, a direct drive hub splined on the driven shaft, and means for shifting said direct drive hub to form a bidirectional coupling between said shiftable plate and driven shaft, and co-operating clutch means on said hub and driving shaft whereby said shiftable means is operable for forming a direct connection between the driving shaft and driven shaft by means of said hub.

4. In an automobile, in combination, a clutch including a main friction clutch including a driving plate and driven plate, a driving shaft connected to the driving clutch plate, a driven shaft adapted to be driven by said driven clutch plate, an over-running clutch disposed between said driven plate and driven shaft, a shiftable direct drive member in driving relation with the driven shaft having teeth adapted to mesh with teeth carried by the driven plate assembly, whereby the overrunning clutch can be rendered ineffective, cooperating jaw clutch members on the direct drive member and driving shaft, and means for moving the direct drive member to provide a direct drive between the two shafts, a direct drive through the plate clutch or drive through the overrunning clutch.

5. In an automobile, in combination, a driving shaft, a driven shaft, an overrunning clutch including a drive ring assembly and driven ring disposed between said drive shaft and driven shaft, a shiftable direct drive member in driving relation with the driven shaft having teeth adapted to mesh with teeth carried by the drive ring assembly, whereby the overrunning clutch can be rendered ineffective, cooperating jaw clutch members on the direct drive member and driving shaft, and means for moving the direct drive member to provide a direct drive between the two shafts, a drive through the drive ring or drive through the overrunning clutch.

6. In an automobile, in combination, a drive shaft and a driven shaft, an overrunning clutch including a drive ring driven by said drive shaft and a driven ring driving said driven shaft; one of said shafts including a shiftable member, means for shifting said member to three adjacent positions in the central one of which said overrunning clutch functions, and in one of the other of said positions said member has a toothed engagement with one of said rings for rendering said overrunning clutch ineffective and in the third of said positions said members having a third driving relationship with the other of said shafts.

7. In an automobile, in combination, a drive shaft and a driven shaft, an overrunning clutch including a drive ring driven by said drive shaft and a driven ring driving said driven shaft; one of said shafts including a shiftable member, means for shifting said member to three adjacent positions in the central one of which said overrunning clutch functions, and in one of the other of said positions said member has a toothed engagement with one of said rings for rendering said overrunning clutch ineffective and in the third of said positions said member having a third driving relationship with the other of said shafts; one of the extreme positions providing a direct drive between said shafts and the other providing a drive between said shafts involving a clutch other than the overrunning clutch.

8. In an automobile, in combination, a drive shaft and a driven shaft, an overrunning clutch including a drive ring driven by said drive shaft and a driven ring for driving said driven shaft; one of said shafts including a shiftable member, means for shifting said member to two positions in one of which said member has a toothed engagement with at least one of said rings for rendering said overrrunning clutch ineffective, and in the other of which said member affords a different driving relationship with the other of said shafts; the relationship in one instance being a two-way direct drive and in the other instance being a drive through a clutch other than the overrunning clutch; said driven shaft being driven through said overrunning clutch when said member is passing between said positions.

9. In an automobile, in combination, a drive shaft and a driven shaft, a clutch for at times completing a driving relation between said shafts and a free wheeling device for at times completing a driving relation between said shafts, one of said shafts including a shiftable member shiftable between two positions, in one of which it connects said shafts for direct drive and in the other of which it connects said shafts in driving relationship through said clutch; said shafts being connected through said free wheeling device while said member passes from one of said positions to the other.

10. In a motor vehicle drive, a driving shaft, a driven shaft axially aligned with said riving shaft, an overrunning clutch having cooperating clutching elements adapted to drivingly connect said shafts for transmitting a 1 to 1 one-way drive from said driving shaft to said driven shaft, a set of clutch teeth drivingly connected to said driving shaft, a second set of clutch teeth drivingly connected to said driven shaft, means for shifting one of said sets of clutch teeth into engagement with the other to establish a 1 to 1 two-way drive between said shafts, and means operable to connect said shafts for a two-way drive therebetween when said set of shiftable clutch teeth is shifted out of clutching engagement with the other of said sets of clutch teeth, the last said shaft connecting means including a second clutch interposed therein for controlling the last said two-way drive, said second clutch comprising clutching members rotatable at the same speed when clutched.

11. In a motor vehicle drive, a drive shaft, a driven shaft axially aligned with said driving shaft, an overrunning clutch having cooperating clutching elements adapted to drivingly connect said shafts for transmitting a 1 to 1 one-way drive from said driving shaft to said driven shaft, a set of clutch teeth always drivingly connected to said driving shaft, a second set of clutch teeth always drivingly connected to said driven shaft, a shiftable tooth-carrier mounting one of said sets of clutch teeth, means for shifting said tooth-carrier to shift one of said sets of clutch teeth into engagement with the other to establish a 1 to 1 two-way drive between said shafts, and means operable to connect said shafts for a two-way drive therebetween when said set of shiftable clutch teeth is shifted out of clutching engagement with the other of said sets of clutch teeth, the last said shaft connecting means including a second clutch interposed therein for controlling the last said two-way drive, said second clutch comprising clutching members rotatable at the same speed when clutched, the last said shaft connecting means further including a third set of clutch teeth drivingly connected to one of the members of said second clutch, said shiftable tooth-carrier being drivingly connected with said third set of clutch teeth when said set of shiftable teeth is shifted as last aforesaid.

12. In a motor vehicle drive, a driving shaft, a driven shaft axially aligned with said driving shaft, an overruning clutch having cooperating clutching elements adapted to drivingly connect said shafts for transmitting a 1 to 1 one-way drive from said driving shaft to said driven shaft, a set of clutch teeth drivingly connected to said driving shaft, a second set of clutch teeth drivingly connected to said driven shaft, a shiftable tooth-carrier mounting one of said sets of clutch teeth for shifting movement, means for shifting said tooth-carrier to shift one of said sets of clutch teeth into engagement with the other to establish a 1 to 1 two-way drive between said shafts, and means operable to connect said shafts for a two-way drive therebetween when said set of shiftable clutch teeth is shifted out of clutching engagement with the other of said sets of clutch teeth, the last said shaft connecting means including a second clutch interposed therein for controlling the last said two-way drive, said second clutch comprising clutching members rotatable at the same speed when clutched, the last said shaft connecting means further including means for drivingly connecting one of the members of said second clutch with one of said shafts through the intermediary of said shiftable tooth-carrier, the other member of said second clutch being always drivingly connected to the other of said shafts.

13. In a motor vehicle drive, in combination, axially aligned driving and driven shafts, a set of clutch teeth drivingly connected to said driving shaft, a second set of clutch teeth drivingly connected to said driven shaft, a shiftable tooth-carrier mounting one of said sets of clutch teeth for shifting movement, means for shifting said tooth-carrier to shift one of said sets of clutch teeth into engagement with the other to provide a direct two-way drive between said shafts, means including inner and outer overrunning clutch members adapted to drivingly connect said shafts for a direct overrunning drive therebetween, and clutch controlled means providing a further two-way drive between said shafts only when said set of shiftable clutch teeth is shifted out of engagement with the other set of clutch teeth, the last said driving means including a set of internal clutch teeth always drivingly connected to one member of the last said clutch and adapted for driving connection with one of said shafts through the intermediary of said shiftable tooth-carrier clutching therewith.

14. In a motor vehicle drive, in combination, a driving shaft, a driven shaft axially aligned with said driving shaft, one of said shafts having a set of clutch teeth drivingly connected thereto for rotation at the same speed therewith, a shiftable clutch member drivingly connected to the other of said shafts for rotation at the same speed therewith and having a set of clutch teeth engageable with the first said set of clutch teeth to connect said shafts for a direct two-way drive therebetween, means including inner and outer overrunning clutch members for drivingly connecting said shafts independently of the first said set of clutch teeth for a direct one-way drive from said driving shaft to said driven shaft, a set of internal clutch teeth drivingly connected to one of said overrunning clutch members for rotation at the same speed therewith and adapted for driving connection with said shiftable clutch member when the latter is shifted from its position of engagement with the first said set of clutch teeth, and clutch controlled means for drivingly connecting said shafts for a second two-way drive therebetween when said shiftable clutch member is shifted as last aforesaid.

15. In an automobile, in combination, a drive shaft and a driven shaft, an overrunning clutch including a drive ring driven by said drive shaft and a driven ring for driving said driven shaft; one of said shafts including a shiftable member, means for shifting said member to two positions in one of which said member has a toothed engagement with at least one of said rings for rendering said overrunning clutch ineffective, and in the other of which said member affords a different driving relationship with the other of said shafts; the relationship in one instance being a direct drive and in the other instance being a further drive; means operable to control the operation of one of said drives when said member occupies one of said positions corresponding to this drive.

16. In an automobile, in combination, a drive shaft and a driven shaft, means including a pair of drive controlling elements relatively engageable with each other for at times completing a driving relation between said shafts, said means further including a shiftable member continuously drivingly connected to one of said shafts and shiftable between two positions in one of which said member provides a one-to-one drive connection between said shafts and in the other of which said member affords connection of said shafts in driving relationship when said pair of drive controlling elements are relatively engaged with each other, and a free wheeling device for at times completing a driving relationship between said shafts, said shafts being connected through said free wheeling device while said member passes from one of said positions to the other.

17. In an automobile, in combination, a drive shaft and a driven shaft, means including a pair of drive controlling elements relatively engageable with each other for at times completing a driving relation between said shafts, said means further including a shiftable member shiftable between two positions in one of which said member provides a one-to-one drive connection between said shafts and in the other of which said member affords connection of said shafts in driving relationship when said pair of drive controlling elements are relatively engaged with each other, means providing driving connection from one of said shafts to said shiftable member at least during said one-to-one drive, and a free wheeling device for at times completing a driving relationship between said shafts, said shafts being connected through said free wheeling device while said member passes from one of said positions to the other.

18. In a motor vehicle drive, a driving shaft, a driven shaft axially aligned with said driving shaft, an overrunning clutch having cooperating clutching elements adapted to drivingly connect said shafts for transmitting a 1 to 1 one-way drive from said driving shaft to said driven shaft, a set of clutch teeth drivingly connected to said driving shaft, a second set of clutch teeth drivingly connected to said driven shaft, means for shifting one of said sets of clutch teeth into engagement with the other to establish a 1 to 1 two-way drive between said shafts, and means operable to connect said shafts for a two-way drive therebetween when said set of shiftable clutch teeth is shifted out of clutching engagement with the other of said sets of clutch teeth, the last said shaft connecting means including a device operable to control the operation of the last said two-way drive.

HANS F. KOLB.
CLAUDE M. PADGETT.